Figure 1:
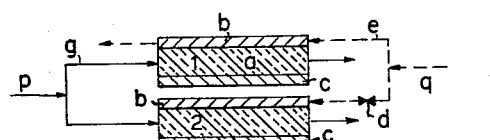

Nov. 22, 1960 P. J. HARINGHUIZEN 2,960,836
PROCESS AND APPARATUS FOR PURIFYING GASES
Filed Sept. 27, 1955 3 Sheets-Sheet 1

Inventor
Pieter J. Haringhuizen
By Cushman, Darby & Cushman
attorneys

Nov. 22, 1960     P. J. HARINGHUIZEN     2,960,836
PROCESS AND APPARATUS FOR PURIFYING GASES
Filed Sept. 27, 1955     3 Sheets-Sheet 2

Inventor
Pieter J. Haringhuizen
By Cushman, Darby & Cushman
attorneys

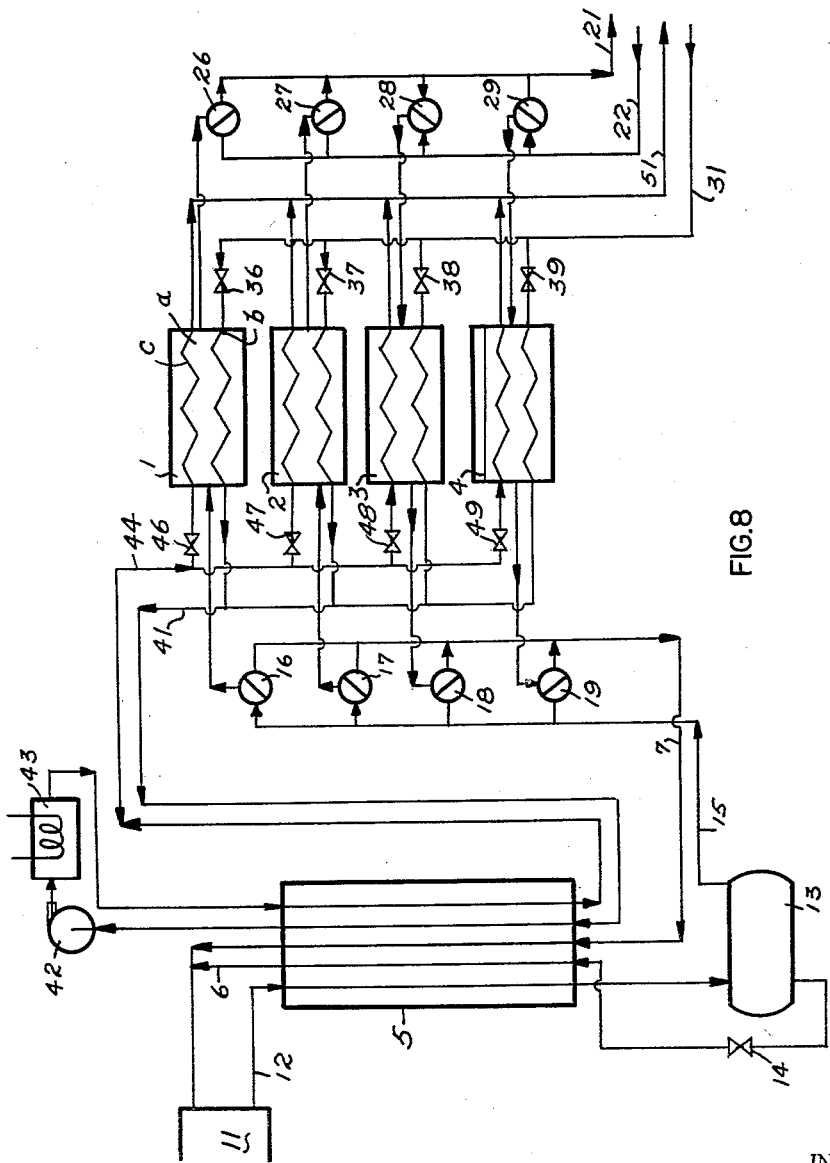

United States Patent Office 2,960,836
Patented Nov. 22, 1960

2,960,836
PROCESS AND APPARATUS FOR PURIFYING GASES

Pieter J. Haringhuizen, Geleen, Netherlands, assignor to Stamicarbon N.V., Heerlen, Netherlands Filed Sept. 27, 1955, Ser. No. 537,070

Claims priority, application Netherlands Oct. 1, 1954

16 Claims. (Cl. 62—13)

The invention relates to the purification of gases by the removal of gaseous impurities and is particularly but not exclusively concerned with the purification of technical hydrogen, e.g., such hydrogen as can be obtained in the water gas reaction, by cooling to a temperature below 65° K. to deposit in the solid form residual impurities such as nitrogen, carbon monoxide and argon. The invention will consequently be more particularly described in the latter application, which will be of special importance in connection with the distillation of hydrogen.

The distillation of hydrogen on a technical scale is employed as a means for the separation of hydrogen into its isotopes and the isolation of deuterium. Ordinary hydrogen, however, contains no more than 0.015% of deuterium. This implies that if considerable quantities of deuterium are to be produced, very large quantities of hydrogen have to be distilled. Consequently, a deuterium plant is only an economical proposition if the hydrogen, after being freed of deuterium, can be immediately used for other purposes, e.g., for the synthesis of ammonia. A deuterium plant connected to an ammonia synthesis plant is described in Chem. Eng. Progr. 50, 5; 227–228. In order that the hydrogen can be cooled down to the distillation temperature and distilled, it is necessary for the other gases present in the hydrogen, such as nitrogen and carbon monoxide to be removed very thoroughly. In the following only the removal of nitrogen will be dealt with. However, the invention is not restricted to the removal of nitrogen and other gases such as argon, carbon monoxide and oxygen may also be removed in the same manner, simultaneously with the nitrogen.

As a matter of course, the major portion of the nitrogen may be removed from the hydrogen by cooling the latter in heat-exchangers to a temperature lower than the condensation temperature but higher than the melting point (63° K.) of nitrogen. Cooling below the melting point of nitrogen, before the major portion thereof has been removed, would give rise to obstructions by solid nitrogen.

After removal of the liquid nitrogen, the hydrogen, which—depending on its pressure—may still contain 2–3% of nitrogen, must be cooled down further, but during this operation solid nitrogen is deposited.

In the following the use of heat regenerators only will be discussed though it will be understood that reversing heat-exchangers may be equally well used.

The present invention is directed to depositing the impurities in a gas while cooling in a zone and subsequently flushing the zone in the opposite direction with a different gas in order to evaporate the deposited impurity, the temperature being controlled so that in the zone the average temperature is lower during the deposition than it is during the evaporation.

Referring to the drawings, Figures 1–4 diagrammatically illustrate the flow in a battery of four regenerators operating according to the invention in a four-period cycle.

Figure 5:
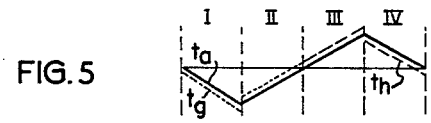
Figure 6:
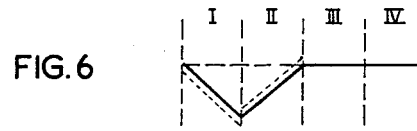
Figure 7:
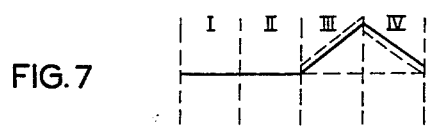

Figures 5, 6 and 7 indicate three different temperature patterns obtained in each of the four regenerators by three different methods of control.

Figure 8 is a diagrammatic flow sheet.

It has been found that the maximum vapour tension of the nitrogen increases considerably with the hydrogen pressure and to such a degree that at certain temperatures the maximum percentage of nitrogen vapour in hydrogen may even be higher in hydrogen of higher pressure than in hydrogen of lower pressure.

Now we have found how the hydrogen can be freed of nitrogen by freezing the latter out in heat-regenerators, notwithstanding the way in which the maximum vapour tension of nitrogen in hydrogen changes unfavourably with the hydrogen pressure as before referred to.

In contrast to the past procedures, in the process according to the invention for the purification of a gas by cooling and deposition of impurity by condensation to the solid state employing a heat-regenerator or reversing heat-exchanger, the temperature is controlled so that the temperature at any place in the regenerator or exchanger is on average lower during the deposition than the average temperature at that place during the evaporation.

In carrying out the process according to the invention, the regenerator or exchanger need not be alternately traversed by a gas of higher and a gas of lower pressure, but the pressure of the flushing gas used for removing impurity, e.g., nitrogen, is preferably kept substantially equal to the pressure under which the gas to be purified, e.g., the hydrogen, is passed through the apparatus for cooling with simultaneous deposition of the impurity. This offers considerable advantages, because in this way pressure surges in the equipment can be prevented when regenerators are being exchanged. In a fully enclosed apparatus, these pressure surges would give rise to considerable difficulties.

The process according to the invention makes use of heat-regenerators provided with at least one pipe system which is to serve for passing a second gas in the opposite direction or of reversing heat-exchangers of large heat capacity, whereas the cold gases need not be of different temperatures.

During the period in which the impurities are deposited and/or during the flushing period, this large heat capacity is used for varying the temperature at any given point of the regenerator by altering the ratio of the gas quantities which during said period are exchanging heat with each other. According to the invention this is effected in such a way that during a period in which the impurities are being deposited the temperature at any given point of the regenerator will first decrease gradually and after that rise again and/or during the period when the impurities are being dissolved said temperature will first rise and subsequently fall.

The gas quantities that are exchanging heat with each other are preferably so chosen that the total heat capacity of each of said gases, considered over the whole duration of a passage period, will be the same. When switching over, the temperature at any given point of the regenerator will then be equal again to the temperature at the beginning of the period. If not, the temperatures will, at the moment of switching over, show a slight fluctuation in which connection it is to be remarked that, if the process is to be carried out as a continuous operation, measures have to be taken to ensure that the temperature at any given point will, after completion of the whole cycle, be equal again to the temperature at the beginning of the cycle.

In carrying out the invention we prefer to employ apparatus comprising four regenerators (or exchangers of sufficiently large heat capacity) each having a passage, packed with filling material, for the gas to be cooled and purified and, subsequently, for the passage of the flushing gas, and comprising also at least two independent pipe systems through each of which gas can be conducted in heat-exchange relation with the gas flowing through the said passage.

With this apparatus, purification according to the invention may proceed continuously in a cycle of four periods. In each of these periods cooling with deposition of impurity takes place in two of the regenerators which are temporarily connected in parallel with the supply of the gas to be purified and flushing takes place in the other two regenerators which are temporarily connected in parallel with a supply of flushing gas, the parallel pairing of the regenerators changing from period to period but so that there are two consecutive deposition periods and two consecutive flushing periods in each cycle for each regenerator. This may be achieved by connecting the separate pipe systems of each regenerator into two independent systems common to the four regenerators, one associated with a source of supply of a gas colder than the gas to be purified and the other with a gas warmer than the flushing gas and directing the flow from such sources of supply during the four periods so that in each regenerator the flow of gas to be cooled and purified always takes place in countercurrent and heat exchanging relation with a flow of the colder gas and the flow of flushing gas always takes place in countercurrent and heat exchanging relation with a flow of the warmer gas. By controlling the amounts of gas forming the respective currents through the regenerators the result may be achieved that a fluctuation of temperature takes place in each regenerator during deposition or flushing or both such that the temperature at any place in that regenerator is on average lower during the deposition than the average temperature at that place during the evaporation, while the temperature at any given point of the regenerator is about the same at the commencement as at the termination of the deposition periods and also of the flushing periods.

The manner in which the gas currents may be controlled to obtain the desired temperature effects will best be understood from the examples which will presently be referred to with reference to the accompanying drawings, but it may here be explained that, if for example, in a given period of a four period cycle as above referred to the gas to be purified is passed in equal amounts through two regenerators, then by feeding one of such regenerators with a higher proportion than the second of the countercurrent colder gas the temperature in the said one regenerator may be made to decrease while the temperature in the second rises. Now if during the next period the said one regenerator is to pass through a second deposition period its temperature will require to be increased if the temperature obtaining at the commencement of the deposition is to be restored. The required increase may be obtained by feeding the said one regenerator during the said next period with a proportion of the countercurrent colder gas corresponding to that which in the previous period passed to the said second regenerator provided that in the operation of the four regenerators according to the cycle outlined above the quantities of gas which in any period are in heat exchange countercurrent flow in a pair of parallel connected regenerators are such that the heat capacities per degree, i.e., the products of the specific heat and the quantities, are practically equal to one another. When through the whole temperature range covered by the regenerator the specific heat of the one current is considerably higher than that of the other current, the two currents must differ in the same proportion. In order to attain that the amount of gas to be cooled may yet be equal to the amounts of gas to be heated, a separate cooling will have to be applied in that case. If the difference in specific heat is only noticeable on the cold side, this effect can be eliminated by applying the so-called unbalance flow as is customary in reversing heat exchangers (cf. e.g., Chem. Eng. Progr. 43, 2; 69–73 (1947).

As previously stated the invention is more particularly intended for application to the purification of technical hydrogen and particularly in hydrogen distillation and in that application the cold and $N_2$-free hydrogen expanded to a low pressure (e.g., 1.3 ats.) obtained from the distillation process, may, upon heat exchange, be compressed to a high pressure (e.g. 100 ats.) and restored to the temperature level at the entrance of the regenerators for supply through one of the pipe systems in countercurrent to the flushing gas, and after traversing the regenerators the said hydrogen, whilst delivering its cold, may be expanded to a pressure equivalent to the pressure of the hydrogen to be purified, say 12 ats. and then returned to the regenerators as flushing hydrogen.

Referring to Fig. 1, the four regenerators 1, 2, 3 and 4 each comprises a space $a$ packed with filling material, a pipe system $b$ and a pipe system $c$ each of which is adapted to conduct gas in countercurrent flow and heat exchanging relation with respect to gas for the time being flowing through space $a$. The spaces $a$ of the four regenerators have connection on the left hand side with a source of hydrogen to be purified and on the right hand side with a source of flushing hydrogen. The pipe systems $b$ of the four regenerators have connection with a source of expanded cold hydrogen, e.g., a distillation apparatus, and the pipe systems $c$ of all the regenerators have connection with a source of high pressure hydrogen.

In the first period (Fig. 1) equal currents of hydrogen to be cooled and purified, indicated by full lines $g$, are passed through regenerators 1 and 2 at a pressure $p$ of 12 ats. and at a temperature slightly above the melting point of $N_2$, say 65° K. while currents of expanded cold hydrogen indicated by broken lines $e$ are passed at a pressure $q$ of say 1.3 ats. through the pipe systems $b$ of the said regenerators in countercurrent to the hydrogen to be purified. The quantity of expanded cold hydrogen passing through pipe system $b$ of regenerator 2 is less than the quantity passing through pipe system $b$ of regenerator 1. This is indicated in the figure by the sign $d$. (This sign, wherever it appears in Figures 1 to 4 indicates a reduced current with respect to the parallel current from the same source.) In consequence, in the first period, deposition of nitrogen takes place in both regenerators 1 and 2 but whereas at every point in regenerator 1 the temperature falls during this period, the temperature at every point in regenerator 2 rises due to the deficit of cold in this regenerator.

Also in the first period, equal flushing currents of cold hydrogen indicated by full lines $h$, are passed through regenerators 3 and 4, which are to be regarded as already containing a nitrogen deposit, at a pressure $p$ of say 12 ats. while currents of high pressure hydrogen (pressure $P$ of say 100 ats.), indicated by chain lines $f$, are passed through the pipe systems $c$ of the said regenerators in countercurrent to the said flushing hydrogen. As indicated by the sign $d$ in chain line $f$ more than 50% of the warm high pressure hydrogen passes through regenerator 3 in period 1. In consequence, evaporation of nitrogen takes place in both regenerators 3 and 4 during the first period but whereas the temperature at every point in regenerator 3 rises during this period, the temperature at every point in regenerator 4 correspondingly falls due to the heat deficit therein.

In the second period (Fig. 2), the current of hydrogen to be purified which in the previous period passed to regenerator 2 is now switched to regenerator 4, the cleaning of which was completed in the previous period, deposition continuing in regenerator 1. At the same time the current of flushing gas which in the previous period passed to regenerator 4 is now switched to regenerator 2 in which deposition was completed in the said previous period. In this period therefore deposition proceeds in regenerators 1 and 4 and flushing in regenerators 2 and 3. Furthermore, for the second period, the flow of the high pressure and cold expanded hydrogen is also readjusted. This, inter alia, pipe b of regenerator 1 now receives a reduced amount of the expanded cold hydrogen so that the temperature of this regenerator commences to rise so that by the end of the deposition stage in this regenerator, i.e., at the end of the second period, the temperature will about be restored to its value at the commencement of the said stage. Likewise, the temperature of regenerator 3 which rose during the previous period is now reduced in consequence of a reduced supply of the high pressure hydrogen the major proportion of which is passed to regenerator 2 in which flushing is just commencing.

The current control is again adjusted at the commencement of the third and fourth period and it will be readily seen from the flow lines that the result is that over the four periods the temperature in each regenerator alternately rises and falls. The quantities of hydrogen in the currents (taken collectively) which in each period in each pair of parallel linked regenerators pass in heat exchange relation one to the other are such that the heat capacities per degree, i.e., the products of the specific heat and the quantities, are substantially equal. Moreover the adjustment of the currents from period to period is such that in the second period, as compared with the first period, then as far as the character and quantity of the hydrogen passing through the regenerators are concerned, regenerator 4 takes up the place of regenerator 1, 3 takes up the place of 4, 2 takes the place of 3 and 1 takes the place of 2, and this arrangement is continued through the subsequent period transitions. The result is that the rise and fall of the temperature in each regenerator is more or less regular.

This temperature fluctuation is shown in the graph of Fig. 5 (full line $t_a$) in which the temperature of the filling material at one place in regenerator 1 has been plotted on the vertical axis against the time on the horizontal axis. The numerals I, II, III and IV indicate the four successive periods.

In the periods I and II the hydrogen current to be purified is cooled and nitrogen is deposited and in periods III and IV the deposited nitrogen is taken up by a flushing current of hydrogen of preferably the same pressure as the hydrogen to be purified. The temperature variation of the gases at the place in question in the regenerator is shown by dotted line $t_g$ (hydrogen to be purified) and dash line $t_h$ (flushing hydrogen). In the periods III and IV the average temperature of the gas, and hence also the maximum vapour tension of the $N_2$, is higher than in the periods I and II in which the $N_2$ is deposited. This makes it possible for a larger amount of $N_2$ to be evaporated in the same amount of hydrogen than has been deposited during the previous period. As this holds for any point of the regenerator, it is therefore possible to remove all of the $N_2$ deposited.

In a well designed heat-regenerator the difference between the temperatures of the gas and the filling material is only small, e.g., 1° or less.

In an alternative way of operating the regenerators, the same temperature fluctuation effect may be obtained by replacing the unequal distribution of the gas currents passing through the pipe systems b and c by the unequal distribution of the hydrogen current to be purified and the backward flushing current.

To obtain the same temperature effect in the situation illustrated in Fig. 1, the current of hydrogen to be purified in regenerator 1 would have to be smaller than the current supplied to regenerator 2 and the flushing gas current passing through regenerator 3 smaller than the current passing through regenerator 4.

It is also possible to employ a combination of the two methods, e.g., unequally distributing only the gases to be cooled.

According to another way of carrying out the invention, only one of the currents is distributed unequally, whereas the other three are kept constant. For example, if only the quantity of cold expanded hydrogen is unequally distributed in such a way that in each regenerator the temperature decreases at the start of the first deposition period and increases in the following period, whereas during the two periods in which evaporation takes place the temperature remains constant owing to the equality of the other currents, the condition will yet be satisfied that the average temperature at which the deposition is effected must be lower than the temperature at which the deposited impurity is taken up again. The temperature fluctuation obtained by the method is shown in Fig. 6. A temperature variation as illustrated in Fig. 7 can be obtained in a similar manner; in this case the temperature remains constant in the periods I and II during which the impurity is deposited, whereas in the periods III and IV the temperature increases at first and subsequently lowers with the result that the average temperature during flushing will be higher than the average temperature during deposition.

However, preference is given to the first of the above mentioned possibilities, i.e., to the procedure in which the quantities of the gases passing through the pipe systems b and c are distributed unequally. For in this case, the difference between the average temperature of the gas in which the impurity is deposited and of the gas in which it is dissolved will be largest.

How large the temperature differences have to be in order to permit the impurity to be completely removed, depends on the construction of the regenerators, the velocity at which the gases are passed through and on the pressure of these gases. An average temperature difference of 3–5° will be sufficient in most cases. Referring to Figure 8, the numerals 1, 2, 3 and 4 designate the four heat exchanging regenerators. a designates the free space of the regenerators; b the tubes for the cold gas; c the pipe systems for the warm gas at high pressure. The source of technical hydrogen is designated as 11. The hydrogen is led through tubes 12 to a heat exchanger where the gas is cooled down to a temperature of about the freezing point of nitrogen. In 13 liquefied nitrogen is separated from the gaseous hydrogen. The liquid nitrogen is expended through valve 14 and delivers its cold to the exchanger 5 and is fed back to the source of hydrogen together with hydrogen used for flushing the regenerators 1, 2, 3 and 4. The hydrogen is fed to the exchanging valves 16, 17, 18 and 19 through line 15. In the regenerators the hydrogen is cooled down and the contaminations are frozen out in solid form. The purified cold hydrogen is fed to the plant (e.g., a hydrogen distillation unit) through line 21. Expanded hydrogen is fed back through line 31 via valves 36, 37, 38 and 39 to the tubes b of the regenerators, delivers its cold and flows through line 41 and the heat exchanger to the pump 42, where it is compressed to a high pressure, cooled down below room temperature in heat exchanger 43 and fed back through the exchanger 5 and tubes 44, via the valves 46, 47, 48 and 49 to the tube systems c of the regenerators 1, 2, 3 and 4. Here the high pressure gas flows countercurrent with the flushing gas. The cooled gas is fed to the plant through line 51 and in the plant the high pressure gas is expanded at least partly to the pressure p of the raw hydrogen and fed back as flushing gas via tubes 22, exchange valves 26, 27, 28 and 29, regenerators 1, 2, 3 and 4, line 7, and heat exchanger 5 back to the hydrogen source together with the nitrogen from tank 13.

Figure 2:
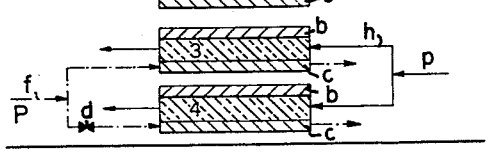
Figure 3:
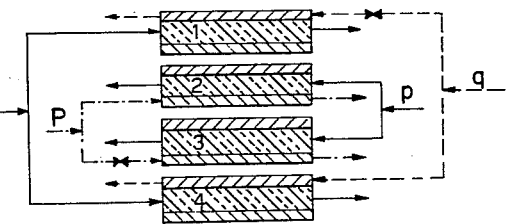
Figure 4:
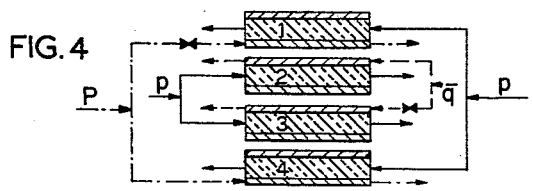

The situation of Figures 1, 2, 3 and 4 is as follows:

| situation | valves | | | | | | | | | | | | | | |
|---|---|---|---|---|---|---|---|---|---|---|---|---|---|---|---|
| | 16 | 17 | 18 | 19 | 26 | 27 | 28 | 29 | 36 | 37 | 38 | 39 | 46 | 47 | 48 | 49 |
| fig. 1 | a | a | b | b | b | b | a | a | o | po | c | c | c | c | o | po |
| fig. 2 | a | b | b | a | b | a | a | b | po | c | c | o | c | o | po | c |
| fig. 3 | b | b | a | a | a | a | b | b | c | c | o | po | o | po | c | c |
| fig. 4 | b | a | a | b | a | b | b | a | c | c | po | c | po | c | c | o |

*a* means: in valves 16–19 and 26–29 the passage from the left to the regenerator is open,
*b* the passage from the right is open. For valves 36–39 and 40–49 *c* means closed, *o* opened and *po* partly opened.

In the drawing in Figure 8 the situation of Figure 1 is shown.

The way in which the various hydrogen currents for carrying out the illustrated process may be obtained has already been referred to.

In purifying hydrogen it will be clear that the process according to the invention cannot be employed up to the distillation temperature of the hydrogen, because the gases passing through the regenerator space cannot be cooled below the boiling point of the hydrogen corresponding with this pressure. Preferably, these gases should not be cooled below 40° K. or thereabouts. The amount of $N_2$ left in the hydrogen is only small (e.g. 0.003% at 12 ats.). The further reduction of the $N_2$-concentration below the maximum vapour tension at the distillation temperature desired may subsequently be effected with the aid of an adsorption filter. At this low temperature level these filters possess a very high capacity, so that it is possible to use filters of reasonable dimensions. Having passed through the filter, the hydrogen may—whether or not after being expanded to the distillation pressure—be cooled down to the final temperature desired by leading it through a heat-exchanger in countercurrent relation to the hydrogen obtained from the distillation process. The cold deficit occurring in the low temperature section as a result of insulation losses etc. is made up by the high-pressure hydrogen cycle by expanding said hydrogen.

After being cooled down in the regenerators, the high-pressure hydrogen is preferably not expanded to the pressure of the hydrogen distillation but, as before referred to, to a pressure corresponding with the pressure of the hydrogen supplied. In this case the pressure of the high-pressure hydrogen is so selected that the cold balance can be put in equilibrium. For from an energy point of view it is advantageous not to expand the high-pressure hydrogen any further; for example the expansion of hydrogen from 100 to 12 ats. already yields the larger portion of the cold that can be obtained by expanding from 100 to 1 at., whilst in compressing a gas from 1.3 ats. to 12 ats. relatively much more energy is required than for compressing from 12 to 100 ats. Since the flushing gas is now fed back at the same pressure at which it is to be supplied to, say, the compressor of the ammonia plant, a considerable advantage is obtained.

As already stated the invention is not restricted to the removal of $N_2$ from $H_2$. The removal of other gases, such as argon and carbon monoxide may be carried out in the same way. In practice, the latter purification may even be carried out simultaneously with the former.

The process may also be used to advantage for cooling and purifying gases other than hydrogen whilst depositing the impurities contained therein.

If the occurrence of pressure surges is not regarded as a serious disadvantage, it suffices to use one set of independent pipe systems per heat-regenerator. Then, the compressed hot gas and the cold gas to be compressed may be alternately passed through said pipe system.

Instead of heat regenerators, reversing heat-exchangers may also be used as already referred to, provided their design satisfies the conditions imposed by the process. For example the spaces alternately traversed by the hydrogen to be purified and the flushing hydrogen, should be packed with filling material of a sufficient heat capacity. The term "reversing heat-exchanger" where used in the following claims means an exchanger satisfying the necessary conditions aforesaid.

It will be understood that the invention is not confined to the application of four regenerators. The same effect may also be obtained with two regenerators if these are arranged in parallel with a heat-exchanger or heat-regenerator, in which the gases flowing countercurrently to the gas to be purified and to the flushing gas are brought in heat-exchange relation with each other. In that case, too, the variation in the gas quantities may be brought about in a simple manner by distributing the said quantities over one of the two heat-regenerators and the heat-exchanger arranged in parallel therewith.

I claim:

1. A process for the purification of a gas by a heat exchanging regenerator system comprising cooling and depositing the impurities in said gas by condensation to the solid state in a plurality of zones and in a plurality of stages, cooling the gas to be purified as it is passed through a first zone in countercurrent flow and in heat exchanging relation with a cold gas and then passing a flushing gas current through said first zone in a subsequent stage of the process in a reverse direction and countercurrently and in heat exchanging relation with a warm gas to thereby evaporate and take up the deposited impurity, the temperature of the gas to be purified and the warm gas flowing countercurrently with the flushing gas at one end and the temperature of the flushing gas and the cold gas flowing countercurrently with the gas to be purified at the other end on entering the regenerator are respectively substantially equal, controlling the temperature in said first zone so that the temperature at any place in said first zone is on the average lower during the period of deposition than the average temperature in said first zone during the period of evaporation while the temperature on the moment of switching of the gases is practically the same and creating this temperature differential by varying the amount of at least one pair of gases that are in heat exchanging relation with each other during the passage of said gases through said zones.

2. Process according to claim 1, wherein the pressure under which the flushing gas is passed through the said first zone is kept substantially equal to the pressure under which the gas to be purified passes therethrough.

3. Process according to claim 1, wherein the temperature is controlled so that the temperature at any given point of the said first zone is substantially the same at the commencement as at the termination of the deposition and the flushing stage.

4. Process according to claim 1, wherein during the deposition stage in each zone the amount of the colder gas passing in countercurrent and heat exchanging relation to the gas to be cooled and purified is first increased to a larger and subsequently decreased to a smaller amount than the average amount passed through during the whole deposition stage and so that during this stage the temperature at any given point of the zone first decreases and subsequently increases.

5. Process according to claim 1, wherein during the flushing stage in each zone the amount of the warmer gas passing in countercurrent and heat exchanging relation to the flushing gas is first increased to a larger and subsequently decreased to a smaller amount than the average amount passed through during the whole flushing stage and so that during this stage the temperature at any given point of the zone first increases and subsequently decreases.

6. Process according to claim 1 wherein four zones are employed, and wherein the purification is carried out continuously in a cycle of four periods in each of which cooling with deposition of impurity takes place in two of the zones which are temporarily connected in parallel with the supply of the gas to be purified, and flushing takes place in the other two zones which are temporarily connected in parallel with a supply of flushing gas, the parallel pairing of the zones changing from period to period but so that there are two consecutive deposition periods and two consecutive flushing periods in each cycle for each zone.

7. Process according to claim 6, wherein each zone has at least two independent conduit systems through each of which gas can be conducted in countercurrent and heat-exchange relation with one of (a) the gas to be purified and (b) the flushing gas flowing through the said zone and where the separate conduit systems of each zone are connected into two independent systems common to the four zones, one associated with a source of supply of a gas colder than the gas to be purified and the other with a gas warmer than the flushing gas and wherein the flow from such sources of supply during the four periods is directed so that in each zone the flow of gas to be cooled and purified always takes place in countercurrent and heat exchanging relation with a flow of the colder gas and the flow of flushing gas always takes place in countercurrent and heat exchanging relation with a flow of the warmer gas.

8. Process according to claim 7 wherein the temperature at any given point of each zone is caused regularly to fluctuate during at least one of (a) the deposition periods and (b) the flushing periods by controlling the amount of gas forming respective currents which pass in heat exchanging relation during said deposition and flushing periods, so that at said given point the temperature at the end of the first flushing period is higher than at the end of the first deposition period.

9. Process according to claim 8, wherein the said amounts of gas are controlled so that at any given point in each zone the temperature at the end of the first deposition period is lower than at the end of the second deposition period and at the end of the second flushing period.

10. Process according to claim 8, wherein the said amounts of gas are controlled so that at any given point in each zone, the temperature at the end of the first flushing period is higher than at the end of the second deposition period and at the end of the second flushing period.

11. Process according to claim 1 wherein in the zones, the flow of gas to be cooled and purified always takes place in countercurrent and heat exchanging relation with a flow of colder gas and the flow of flushing gas always takes place in countercurrent and heat exchanging relation with a flow of warmer gas, and wherein the said colder gas is gas which has previously been purified and which is at a lower pressure than the gas to be cooled and purified passing through the zone and wherein after traversing the zone the said colder purified gas, after continued heating, is compressed to a pressure higher than that of the gas to be purified, and after having cooled down to the temperature level prevailing at the warmer end of the zone, is, at least in part, passed through the zone at the said higher pressure, as the said warmer gas, in countercurrent with flushing gas, whereafter, the said gas at the higher pressure is expanded, simultaneously delivering its cold, substantially to the pressure of the gas to be purified and then returned as flushing gas through the zones.

12. Process according to claim 1 applied in the purification of hydrogen.

13. Process according to claim 12, applied for the removal of residual nitrogen from hydrogen.

14. Process according to claim 13, carried out in the course of the distillation of hydrogen.

15. In a process for distilling hydrogen and recovering the deuterium contained therein, the improvement comprising cooling and purifying the hydrogen to the distillation temperature by the process of claim 11.

16. An apparatus suitable for the purification of a gas by cooling and deposition of solids therefrom comprising four heat exchange means operatively connected together, each heat exchange means having a passage for gas to be cooled and purified and subsequently for flushing gas, said passage being operatively connected to a source of said gas to be cooled and purified and also being operatively connected to a source of said flushing gas, each of said heat exchange means also having at least two independent conduits through each of which gas can be conducted in countercurrent and heat exchanging relation with gas flowing through said passage, said heat exchange means being connected in such manner that during a cycle of four periods cooling with deposition of impurity takes place in two of the heat exchange means connected in parallel while flushing takes place in the other two exchange means also connected in parallel, means for changing the parallel pairing of the heat exchange means during the four-period cycle so that during each cycle there are two consecutive deposition periods and two consecutive flushing periods in each heat exchange means, said independent conduits being parts of two independent systems common to the four heat exchange means, one of the independent systems enabling a gas warmer than the flushing gas to be passed in any period through the heat exchange means then being flushed and the other of the independent systems enabling a gas colder than the gas being purified to be passed in the heat exchange means in which deposition is taking place and means for controlling the amounts of gas passing through two of the heat exchange means in parallel currents from at least one source of supply gas to render the two parallel currents unequal.

References Cited in the file of this patent
UNITED STATES PATENTS

| | | |
|---|---|---|
| 1,842,263 | Gobert | Jan. 19, 1932 |
| 2,062,537 | Twomey | Dec. 1, 1936 |
| 2,097,434 | De Baufre | Nov. 2, 1937 |
| 2,534,478 | Roberts | Dec. 19, 1950 |
| 2,663,167 | Collins | Dec. 22, 1953 |